United States Patent
Nakaniwa (10) Patent No.: US 7,996,998 B2
(45) Date of Patent: Aug. 16, 2011

(54) OPTICAL DEVICE AND MEASURING METHOD

(75) Inventor: Kazuhide Nakaniwa, Minoo (JP)

(73) Assignees: Kansai Kouji Sokuryou Co., Ltd., Minoo-Shi, Osaka (JP); Kazuhide Nakaniwa, Minoo-Shi, Osaka (JP)

( * ) Notice: Subject to any disclaimer, the term of this patent is extended or adjusted under 35 U.S.C. 154(b) by 0 days.

(21) Appl. No.: 12/596,294

(22) PCT Filed: Oct. 2, 2008

(86) PCT No.: PCT/JP2008/067942
§ 371 (c)(1),
(2), (4) Date: Dec. 1, 2009

(87) PCT Pub. No.: WO2009/044817
PCT Pub. Date: Apr. 9, 2009

(65) Prior Publication Data
US 2010/0095539 A1    Apr. 22, 2010

(30) Foreign Application Priority Data
Oct. 4, 2007   (JP) .................. 2007-261052

(51) Int. Cl.
*G01C 5/00*   (2006.01)
(52) U.S. Cl. ...................... 33/292
(58) Field of Classification Search ........... 33/290, 33/292
See application file for complete search history.

(56) References Cited

U.S. PATENT DOCUMENTS 5,475,930 A * 12/1995 Kimura .................. 33/290
5,815,095 A *  9/1998 Yamamoto .............. 356/3
(Continued)

FOREIGN PATENT DOCUMENTS

| EP | 1 939 583 A1 | 7/2008 |
| JP | 3996946 B2 | 10/2007 |
| WO | WO 2007/032136 A1 | 3/2007 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued in the corresponding International Application No. PCT/JP2008/067942 dated May 14, 2010.
International Search Report of Application No. PCT/JP2008/067942 dated Dec. 16, 2008.
Non-English language version of the Written Opinion of the International Searching Authority of Application No. PCT/JP2008/067942 dated Dec. 16, 2008.

*Primary Examiner* — G. Bradley Bennett
(74) *Attorney, Agent, or Firm* — Buchanan Ingersoll & Rooney PC (57) ABSTRACT

An optical device capable of measuring a condition such as deflection of a cylindrical body such as utility pole or cylindrical column precisely and rapidly is provided. The optical device has a telescope with a projection plate. The projection plate has a reference scale made of a plurality of full or substantially full circles arranged concentrically about a central axis of the telescope or a plurality of circular arcs arranged symmetrically about the central axis.

4 Claims, 10 Drawing Sheets

U.S. PATENT DOCUMENTS

| | | | |
|---|---|---|---|
| 6,354,010 B1* | 3/2002 | Shirai | 33/292 |
| 7,200,945 B2* | 4/2007 | Endo | 33/290 |
| 7,667,823 B2* | 2/2010 | Nakaniwa | 356/3.1 |
| 2006/0191148 A1* | 8/2006 | Lippuner | 33/290 |
| 2007/0180716 A1* | 8/2007 | Hertzman | 33/290 |
| 2008/0043314 A1* | 2/2008 | Hagler | 359/237 |
| 2009/0135401 A1 | 5/2009 | Nakaniwa | |
| 2009/0235570 A1* | 9/2009 | Sammut et al. | 42/122 |

* cited by examiner

OPTICAL DEVICE AND MEASURING METHOD

TECHNICAL FIELD

The present invention relates to an optical device and, in particular, to an optical device for suitably measuring a cylindrical structure with a cylindrical outer peripheral surface. The present invention also relates to a method for measuring the cylindrical body using the optical device.

BACKGROUND OF THE INVENTION

There have been reported several accidents in which utility poles made of concrete were broken. This is considered to be caused by the long-term bending load on the utility pole from the supported wires. To avoid such accidents, the utility poles with a large bending strain have been replaced by new ones. However, the amount of bending strain could not be measured precisely.

DISCLOSURE OF INVENTION

Accordingly, the present invention provides an optical device by which the bending strains of cylindrical structures such as utility pole are reliably measured and a method for measuring the conditions of the cylindrical structures by the use of the optical device.

To attain this, the optical device according to the present invention comprises a telescope (16) including a projection plate (46) on which an object image is projected, the projection plate (46) having a reference scale (50) made of a number of circular arcs (51') provided concentrically and symmetrically about a central axis (18) of the telescope (16).

An optical device (10) of the invention comprises a telescope (16) including a projection plate (46) on which an object image is projected, the projection plate (46) having a reference scale (50) made of a number of full or substantially full circles (51) provided concentrically and symmetrically about a central axis (18) of the telescope (16).

According to another aspect of the invention, the optical device comprises a measurement means (20) for measuring a distance (L) from a reference point ($P_0$) of the telescope (16) to a surface point (Ps) on a cylindrical body (100) and an elevation angle ($\theta$) when an internal center (Pc) is collimated by the telescope (16).

According to another aspect of the invention, the optical device comprises an input section (22) for inputting a scale number ($n_\alpha$) associated with the reference scale (50); a first calculating means for calculating a view angle ($\alpha$) of the object using the scale number ($n_\alpha$) input from the input section (22); and a second calculating mans for calculating coordinates of the internal center (Pc) of the collimated cylindrical body (100) from the view angle ($\alpha$), the distance (L), and the elevation angle ($\beta$).

According to another aspect of the invention, the optical device, the measurement means (20) has a measurement section using laser or ultrasonic wave.

A method for measuring a cylindrical body using an optical device according to the invention comprises providing an optical device (10) having a telescope (16) and a measurement section (20), the telescope (16) having a projection plate (46) supporting a reference scale (50) made of a plurality of circles (51) or circular arcs (51') concentrically about an optical axis (18), the measurement section (20) being designed for measuring a distance (L) from the telescope (16) to the cylindrical body (100) and an elevation angle ($\theta$) when the cylindrical body (100) is collimated by the telescope;

using a view angle ($\alpha$) of the cylindrical body (100) when the cylindrical body (100) is collimated by the telescope (16), the distance ($L_0$), and the elevation angle ($\theta$), and to calculate coordinates of a center of the cylindrical body (100), wherein a scale number ($n_\alpha$) read from the reference scale (50) is associated with the view angle ($\alpha$).

According to the optical device and the method, the condition such as deflection of the cylindrical body such as utility pole or cylindrical column can be measured precisely and shortly.

DESCRIPTIONS OF REFERENCE NUMERALS

10: measuring device
12: base
14: main body
16: telescope
18: optical axis
20: measurement section (measurement means)
22: input section
24: display section
26: output section
28: computer
30: controller
32: calculation section
34: assessment section
36: memory section
40: object lens
42: focusing lens
44: erect prism
46: focusing plate (projection plate)
48: eyepiece lens
50: reference scale
51: circle
51': circle arc
100: utility pole
102: image of utility pole

BEST MODE FOR CARRYING OUT THE INVENTION

Referring to the accompanying drawings, the optical device and the method for measuring cylindrical structures using the device, according to the invention, will be described below. In this application, the "optical device" may be a telescope, a collimating telescope, or a measuring or surveying instrument with a collimating and a distance surveying functions. The "cylindrical structure" may include a cylindrical column with a cylindrical peripheral surface, such as utility pole or cylindrical architectural building or structure. It is not necessary for the cylindrical body to have a uniform outer diameter, namely, the cylindrical body may be in the form of conical cone, circular truncated cone, or calabash, having different diameters from place to place. Typically, the cylindrical structure is not needed to be oriented vertically and may be oriented obliquely or horizontally. For the better understanding of the invention, the cylindrical body is a utility pole in the following embodiments in which the condition or the amount of bending of the utility pole is measured.

1-1: Surveying Device

Figure 1:
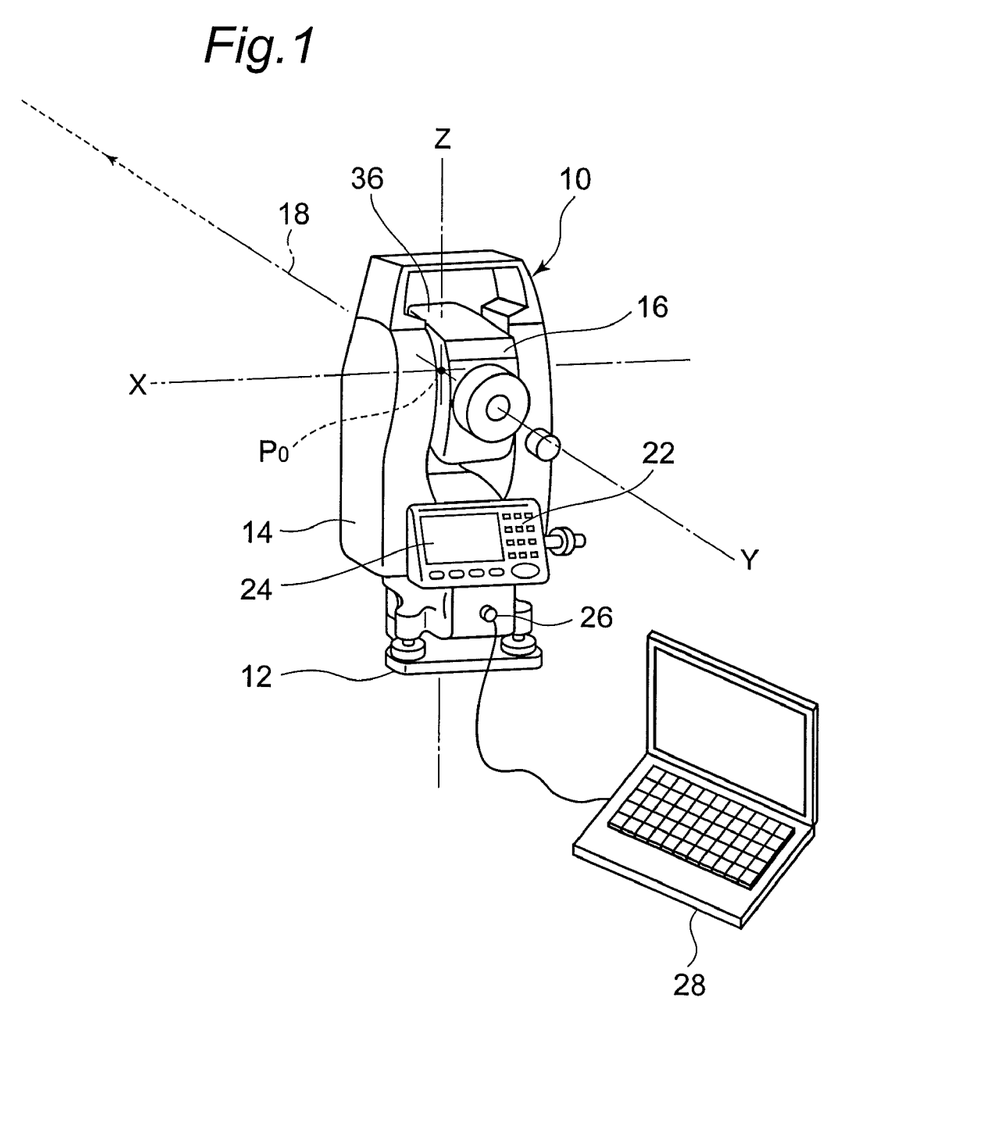
FIG. 1 is a perspective view of a measuring device which is an embodiment of the optical device according to the invention.

FIG. 1 shows a laser surveying device 10 or total station which is an embodiment of the optical device according to the invention. The surveying device 10, like conventional surveying devices, has a base 12 which is releasably coupled and fixed on a tripod stand not shown, a main body 14 coupled on the base 12 for rotation about a vertical axis (Z-axis), and a telescope coupled on the main body 14 for rotation about a horizontal axis (X-axis). The surveying device 10 includes a measurement means or section, indicated by reference numeral 20 in FIG. 2, for measuring a distance from a reference point $P_0$ or mechanical reference point where three axes, i.e., a vertical axis (Z-axis), a first horizontal axis (X-axis), and a second horizontal axis (Y-axis) corresponding to the central optical axis 18 of the telescope 16 cross with each other to an object (not shown) collimated by the telescope 16 and an angle of elevation which is an angle between the horizontal X-axis and the optical axis 18. In the embodiment, the surveying device 10 has an input section 22 for inputting data necessary for surveying, a display section 24 for displaying results of the survey, and an output section 26 for outputting the data input through the input section 22 and the result data into another instruments such as computer 28.

Figure 2:
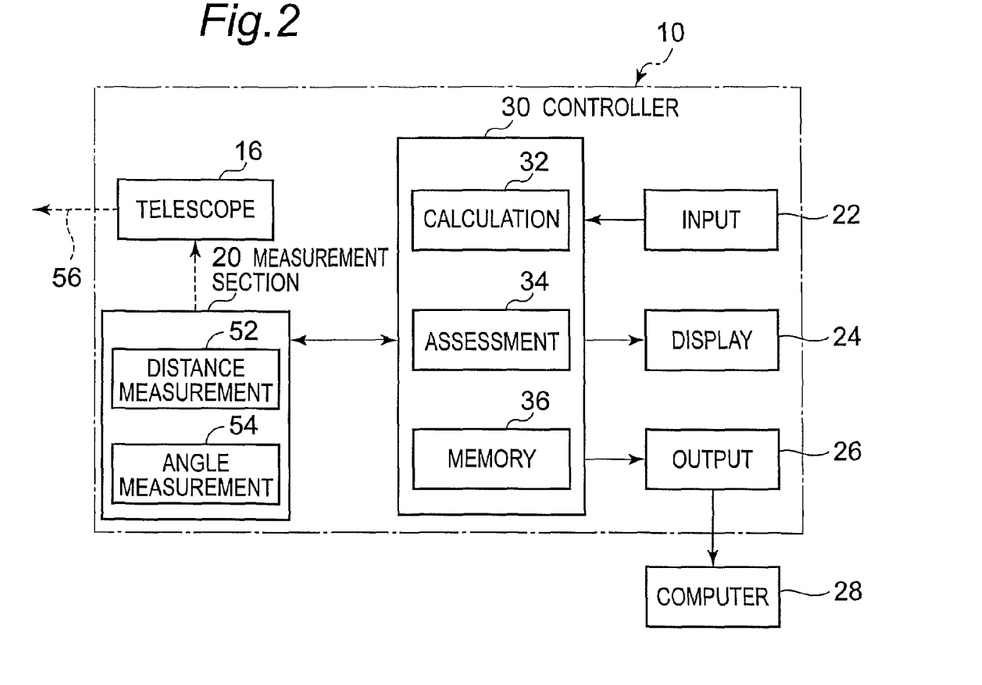
FIG. 2 is a block diagram showing a structure and a function of the measuring device shown in FIG. 1.

FIG. 2 is a block diagram showing the structural and functional elements of the surveying device 10. As shown, the surveying device 10 has a controller 30. The controller 30 is electrically communicated to the measurement section 20, the input section 22, and the display section 24 to control those portions, which will be described in detail below. The control 30 has a calculation section 32 for calculating the coordinates of the internal centers of the utility pole, an assessment section 34 for assessing a risk of bending fracture of the utility pole, and a memory section 36 for storing programs and data necessary for the calculation and assessment. Although not shown, the surveying device 10 has other structural elements necessary for survey, such as leveling instrument and angle measurement section.

1-2: Telescope

Figure 3:
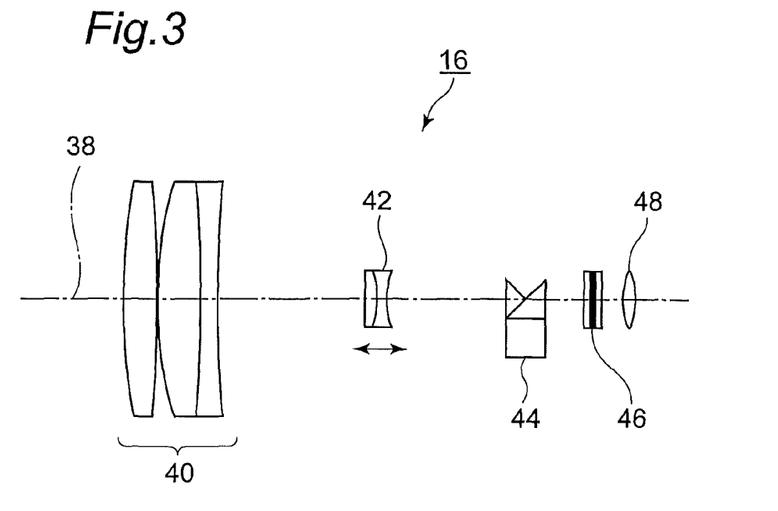
FIG. 3 is a cross sectional view showing a schematic construction of the measuring device shown in FIG. 1.

FIG. 3 shows the schematic structure of the telescope 16. As shown, the telescope 16 has a cylindrical lens barrel which includes an object lens 40, a focusing lens 42, an erect prism 44, a focusing plate or projection plate 46, and an eyepiece lens 48 arranged in this order from the object toward the survey operator, i.e., from left to right in the drawing, so that the collimated object image such as crack image is transmitted through the object lens 40, the focusing lens 42, and the erect prism 44 and focused on the focusing plate 46, which allows the operator to see the enlarged object image through the eye piece lens 48.

1-3: Focusing Plate and Reference Scale

Figure 4:
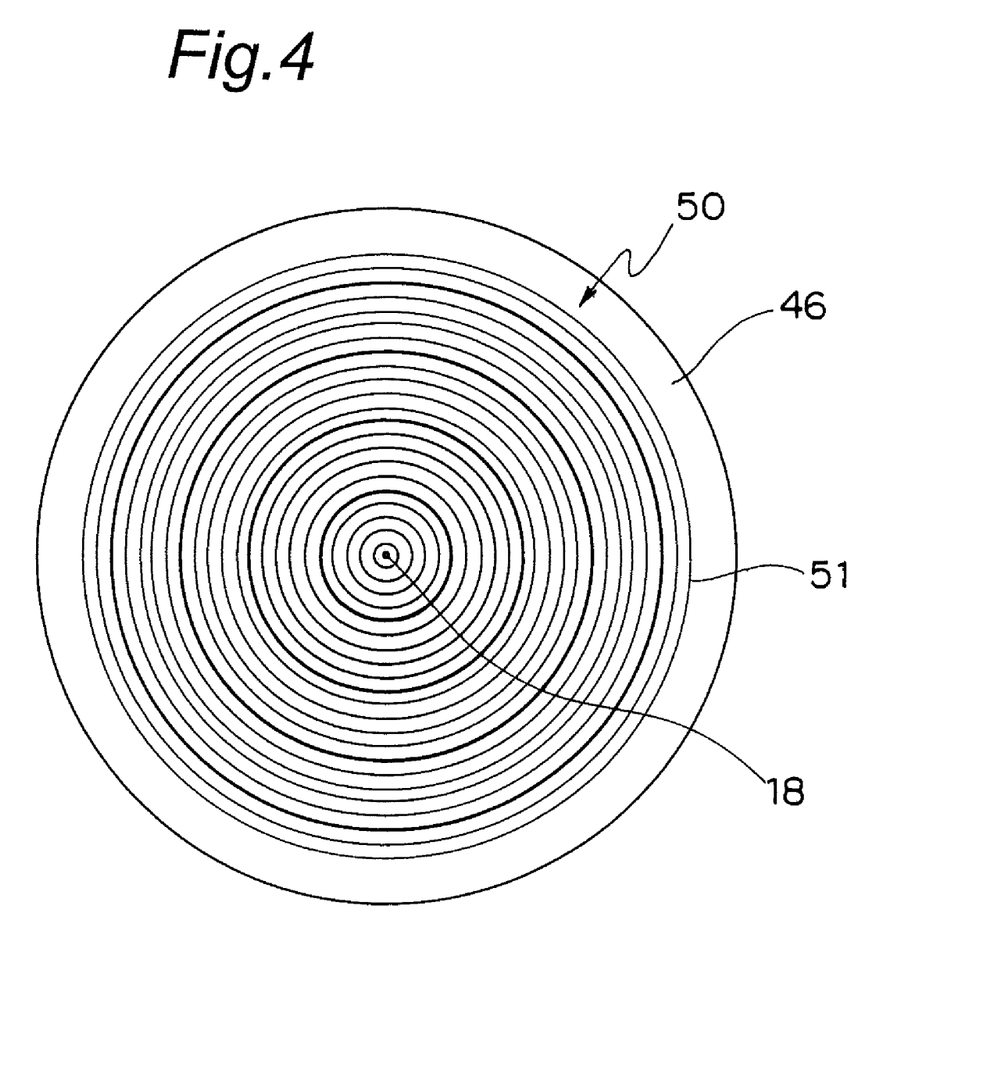
FIG. 4 is a diagram showing a reference scale provided on the focusing plate.

FIG. 4 shows a reference scale, generally indicated by reference numeral 50, drawn on the focusing plate 46. The reference scale 50 has a number of concentric circles 51 each drawn around the optical axis 18. In the following descriptions, the n-th circle in order of distance from the optical axis 18 is indicated as $51(n)$. In this embodiment, the concentric circles 51 are drawn at regular intervals in the radial direction crossing the optical axis 18. The circles 51 may not be regularly spaced away from each other. Also, although the circles 51 are indicated by the heavy line every five circles in this embodiment, the width of the circle lines may be the same.

Figure 5:
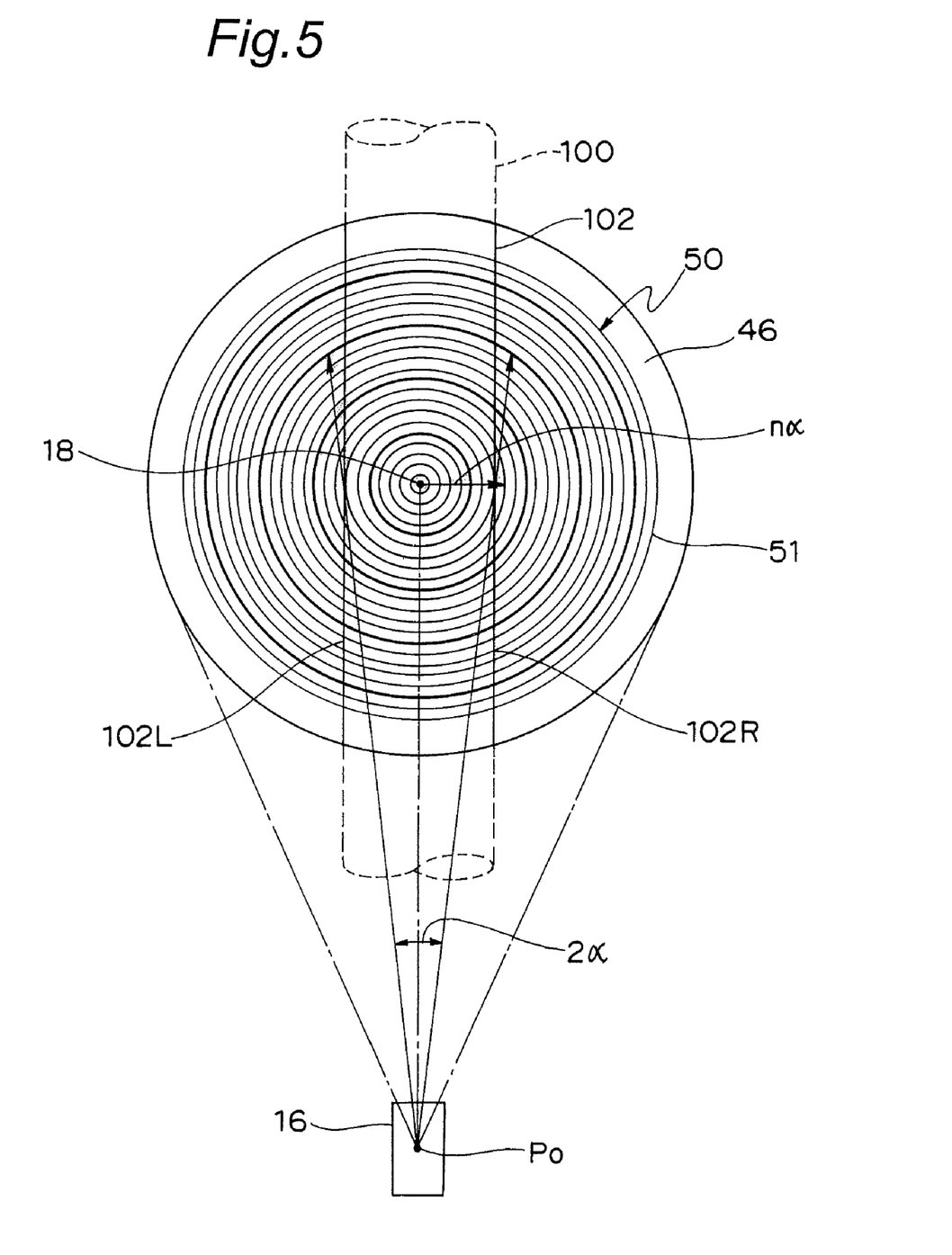
FIG. 5 is a diagram showing a relationship between an image projected on the focusing plate and the telescope.

As shown in FIG. 5, the telescope 16 is adjusted so that the vertical, left and right side edges 102L and 102R of the utility pole image 102 focused on the focusing lens 46 appear at an equal distance from the optical axis 18. In this condition, the length of the lines drawn from the optical axis 18 perpendicularly to the side edges 102L and 102R is indicated as a scale value $n_\alpha$. As indicated in the drawing, the scale number $n_\alpha$ is associated with the view angle $2\alpha$ of the utility pole 100 when viewing it through telescope 16.

In the embodiment shown in FIG. 5, the left and right edges 102L and 102R of the utility pole image 102 are located on the seventh circle $51(7)$. Then, the scale number $n_\alpha$ is "7", which is associated with the view angle $2\alpha$. The left and right edges 102L and 102R may not always on the circle. For example, when the left and right edges 102L and 102R occupies an intermediate position between the seventh circle $51(7)$ and the eighth circle $51(8)$, the scale number $n_\alpha$ is "7.5".

Figure 6:
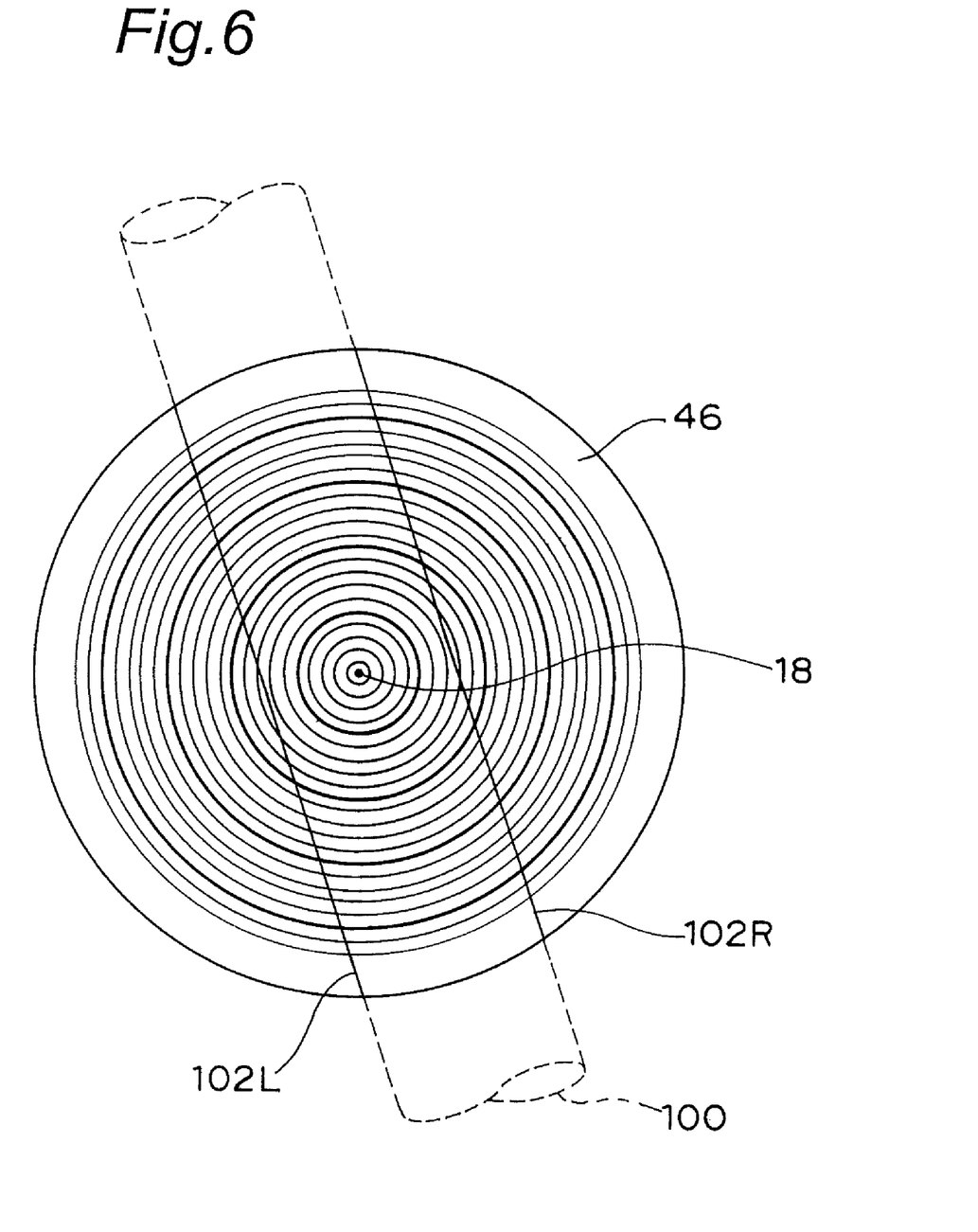
FIG. 6 is a diagram showing a slanted utility pole collimated by the telescope.

FIG. 5 shows the utility pole image 102 which extends vertically. When the utility pole 100 slants, as shown in FIG. 6 the image 102 of the utility pole 100 on the focusing plate 46 also slants. In this instance, as discussed above the telescope 16 is adjusted so that the left and right edges 102L and 102R appear at an equal distance from the optical axis 18 and the length of the lines drawn from the optical axis 18 perpendicularly to the side edges 102L and 102R is indicated as a scale value $n_\alpha$. In the illustrated embodiment, the left and right edges 102L and 102R position between the circles $51(7)$ and $51(8)$ and the scale number $n_\alpha$ is read as "7.2".

The relationship between the scale number $n_\alpha$ and the view angle $2\alpha$ is memorized in the memory section 36 in the form of mathematical scheme or table. Then, when the operator inputs the scale number through the input section 22, the calculation section 32 uses the mathematical scheme or table memorized in the memory section 36 to obtain the view angle $2\alpha$.

1-4: Measurement Section

Figure 7:
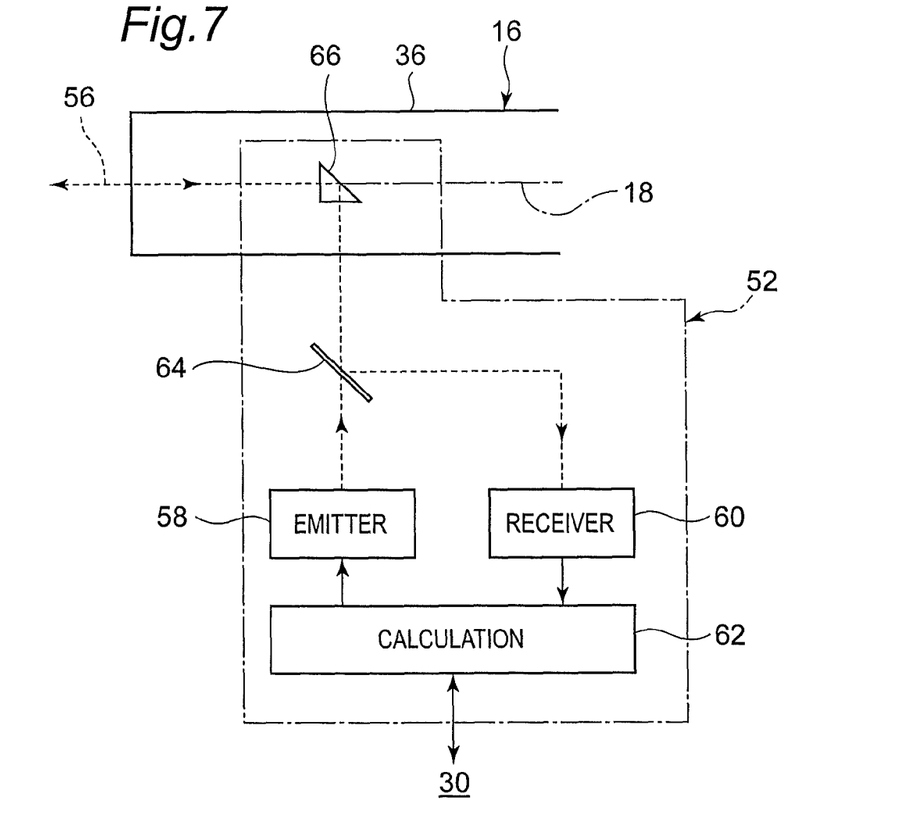
FIG. 7 is a diagram showing a structure of a distance measurement section.

As shown in FIG. 2, the measurement section 20 has a distance measurement sub-section 52 for measuring the slope distance between the collimated object and the reference point $P_0$ and the angle measurement sub-section 54 for measuring the elevation angle θ (i.e., angle between the optical axis 18 and the horizontal plane) and the azimuth angle β or horizontal angle between the optical axis and a certain of azimuth orientation. As shown in FIG. 7, the distance measurement sub-section 52 has a light emitter 58 or laser device made of laser diode, for example, for emitting a laser beam 56, a light receiver 60 for receiving the laser beam reflected from the object, a calculator 62 for calculating the distance between the object and the reference point $P_0$ from a time from the emission to the reception of the laser beam 56, and an optical system 64 for guiding the laser beam 56 from the emitter 58 along the optical axis 18 of the telescope 16 toward the object and also guiding the laser beam 56 coming back from the object along the optical axis 18 into the light receiver 60. As shown, a prism 66 is provided within the interior of the telescope 16 to form a part of the optical system 64 so that a path of the laser beam 56 coincides with the optical axis 18 of the telescope 16. The distance calculation at the measurement section 20 is not limited to use the time from the emission to the reception of light and it may be determined from the phase difference thereof.

1-5: Input Section

Figure 8:
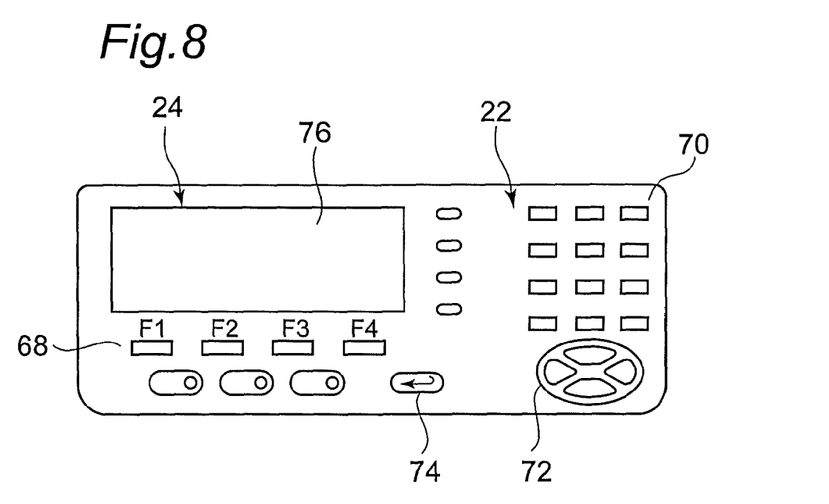
FIG. 8 is a diagram showing the details of the input and display sections shown in FIG. 1.

As shown in FIG. 8, the input section 22 has a number of keys including function keys 68, ten keys 70, cursor keys 72, and enter key 74. The function keys 68 are used for starting the measurements which will be described below. The ten keys 70 are used for entering the scale number $n_\alpha$ read from the reference scale 50 on the focusing plate 46.

1-6: Display Section

Referring back to FIG. 1, the display section 24 has a liquid crystal display for displaying the numerals measured at the measurement section 20, such as distance, elevation angle, and azimuth angle, and the scale number input through ten keys 70, and other information such as results obtained at the calculation section 32.

1-7: Output Section

The output section 26 outputs various information such as measurement results, indicated at the display section 24, and other information such as survey data memorized in the survey device, not indicated at the display section, to the computer 28 communicated thereto.

2-1: Calculation of Centers

Figure 9:
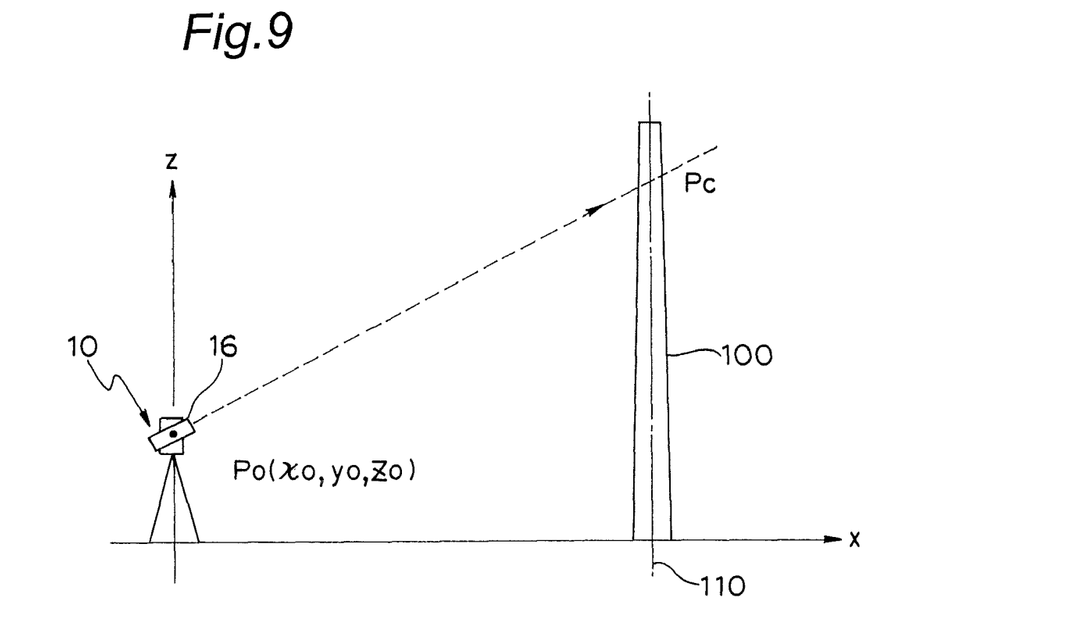
FIG. 9 is a diagram showing the utility pole collimated by the optical device.
Figure 10:
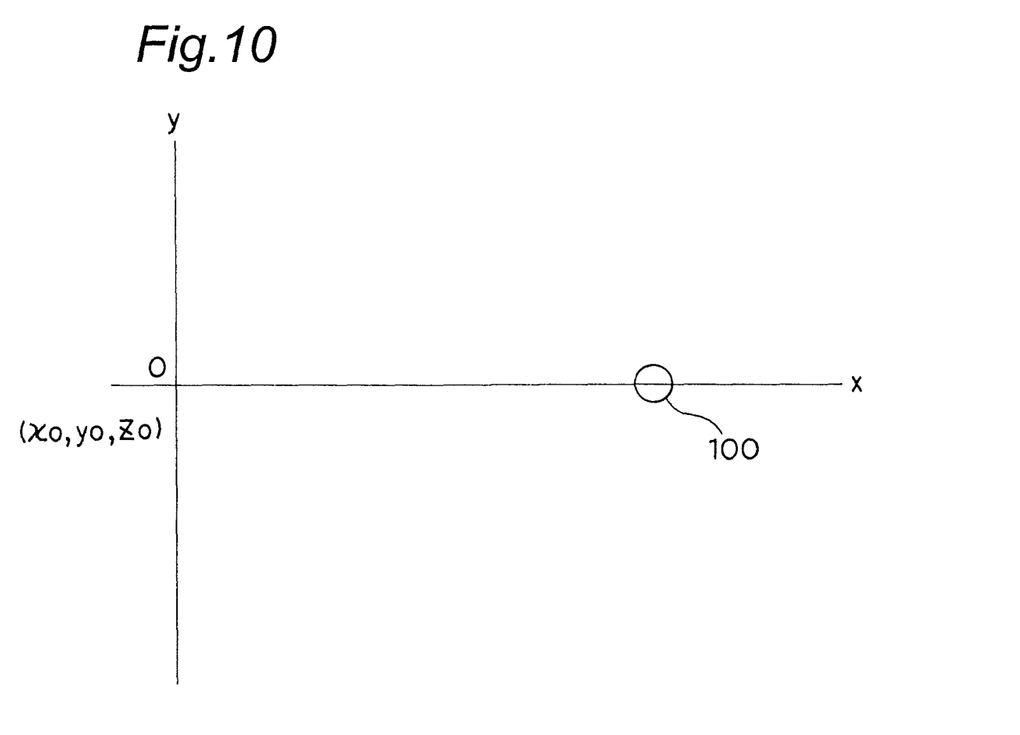
FIG. 10 is a diagram showing a relationship between the reference coordinates and the utility pole.

As shown in FIG. 9, descriptions will be made to a method for measuring central coordinates of the central axis 110 in the utility pole 100 at respective levels. First, the principle for the coordinate calculation will be described. For clarity, it is assumed that, as shown in FIG. 10, the centers of the utility pole 100 at respective levels take respective positions on the X-Z plane, namely, the y-coordinate is always zero.

Figure 11A:
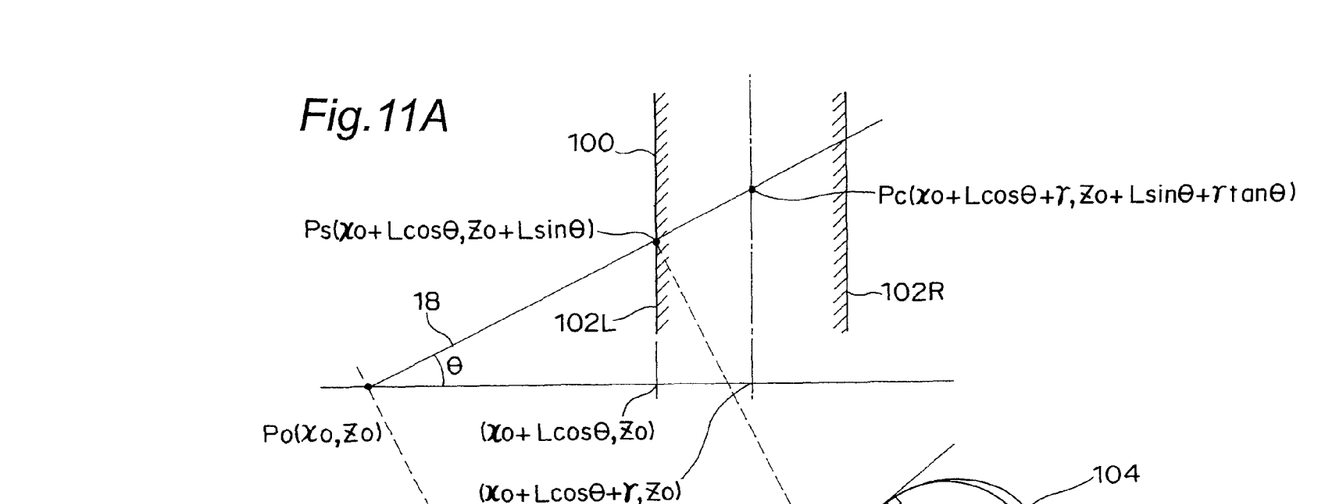
FIG. 11A is a diagram showing a measurement principle.

As shown in FIG. 9, the telescope 16 is collimated at an upper portion of the utility pole 100. In this instance, as shown in FIG. 11A, the surface center Ps at which the optical axis 18 is collimated (i.e., the surface center being a surface point of the utility pole 100 positioned on the optical axis 18 when the telescope 16 is adjusted so that the left and right edges 102L and 102R position at equal distance from the central axis 18) and the internal center Pc of the utility pole 100 on the optical axis 18 have respective coordinates given by the following equations (1) and (2):

$$P0(x0+L \cos\theta, z0+L \sin\theta) \quad (1)$$

$$Pc(x0+L \cos\theta+r, z0+L \sin\theta+r) \quad (2)$$

As shown in FIG. 9, typically the diameter of the utility pole is reduced in proportion to the levels. It can be thought that the level difference, i.e., difference of z-coordinates, between the surface center Ps and the internal center Pc is ten or more centimeters at most. Therefore, it is assumed that the diameter of the utility pole on the horizontal plane including the surface center Ps and that on another horizontal plane including the internal center Pc is the same.

Figure 11B:
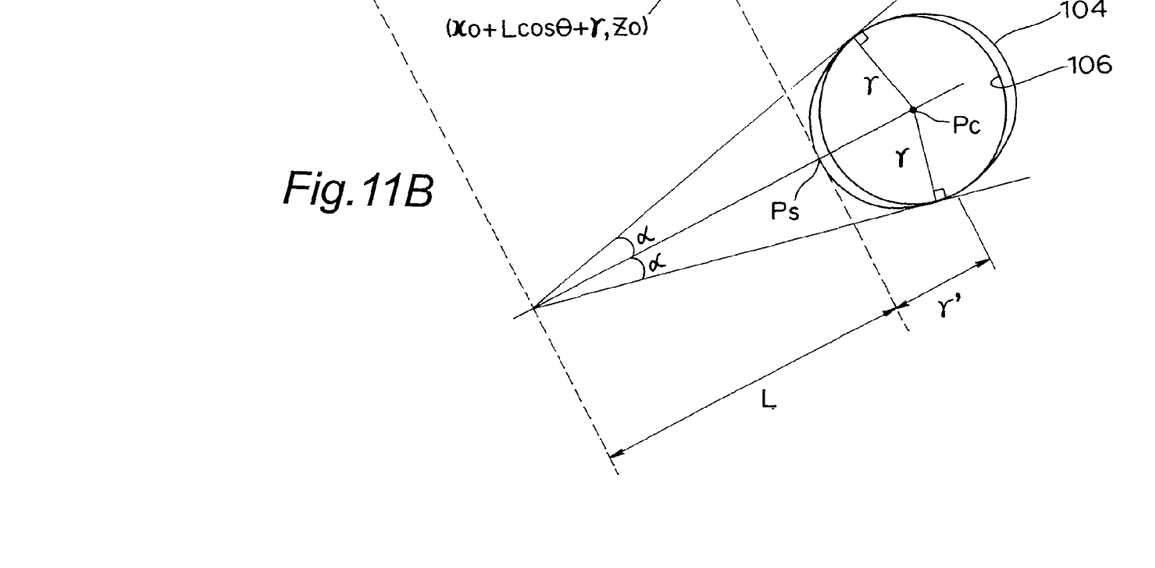
FIG. 11B is a diagram showing the measurement principle.

FIG. 11B shows a slanted cross section 104 on a plane which includes the optical axis and intersects at the elevation angle θ with the horizontal plane and a cross section 106 which includes the surface center Ps or the internal center Pc and positions on a horizontal plane including the surface center. As shown in the drawing, the cross section 106 is indicated by a perfect circle with a radius of r and the cross section 104 is indicated by an ellipse with a major axis length of 2r' and a minor axis length of 2r.

In this instance, as shown in FIG. 11B, the radius of the major axis r' of the ellipse 104, the slope distance L between the reference point $P_0$ and the surface center Ps, the radius of the minor axis of the cross sections 104 and 106, and the view angle α of the utility pole image 102 appeared on the focusing plate 46 have a relationship given by the following equation (3):

$$r'=r/\sin\alpha-L \quad (3)$$

Referring to FIG. 11A, the radii r, r' and the elevation angle θ have a relationship given by the following equation (4):

$$r'=r/\cos\theta \quad (4)$$

From equations (3) and (4), the radius r of the cross section 106 is given by the following equation (5):

$$r=L \sin\alpha \cos\theta/(\cos\theta-\sin\alpha) \quad (5)$$

Therefore, the coordinates Pci(xi, zi) of the internal center Pc on the optical axis 18 is determined by substituting the radius r obtained from the equation (5) into the equation (2).

2-2: Operations at Controller

Figure 12:
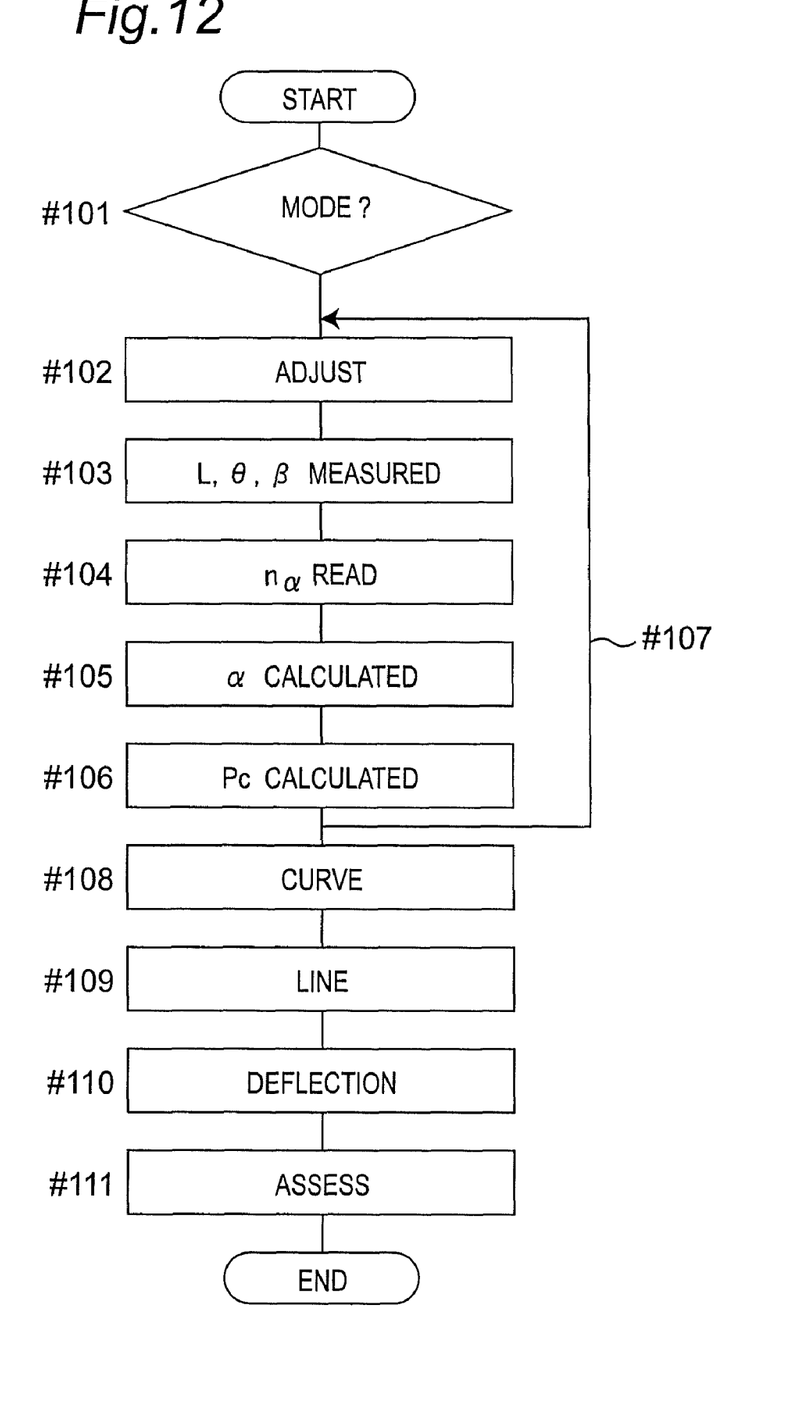
FIG. 12 is a diagram showing processes for determining the centers of the utility pole, determining a deflection, and determining.

Referring to FIG. 12, descriptions will be made to the operations at the controller 30.

At step S101, the a mode key (function key) at the input section 22 is turned on to determine the coordinates of the central axis. Based on the turn-on signal, the controller 30 starts the central-axis, coordinate measuring mode.

At step S102, the measuring point on the utility pole 100 is collimated (see FIG. 9). As shown in FIGS. 5 and 6, the telescope 16 is adjusted so that optical axis 18 places at the internal center Pc of the utility pole 100, namely, the left and right edges 102L and 102R position at an equal distance from the optical axis 18.

At step S103, the distance measuring key (function key) at the input section 22 is turned on. Based on the turn-on signal, the controller 30 drives the distance measurement sub-section 52 to measure the distance L from the reference point $P_0$ to the surface center Ps of the utility pole on the optical axis 18. The measured distance L is stored in the memory section 36. Also, the controller 30 drives the angle measurement sub-section 54 to measure the elevation angle θ and the azimuth angle β, which are then stored in the memory section 36.

At step S104, the operator reads the scale number $n_\alpha$, which is input by means of the ten keys 70 at the input section 22.

At step S105, the calculation section 32 calculates the view angle 2α from the input scale number $n_\alpha$ according to the mathematical scheme or the table. The calculated view angle 2α is stored in the memory section 36.

At step A106, the calculation section 32 retrieves the distance L, the elevation angle θ and the azimuth angle β and calculates the coordinates of the internal center Pc on the optical axis 18 by using the equation (2) stored in the memory section 36. The determined coordinates of the internal center Pc is stored in the memory section 36.

At step S107, the operations from steps 102 to 106 are repeated to the difference points, for example, 10 to 20 points, on the utility pole 100.

At step S108, after reading the coordinates of the internal centers, the calculation section 32 retrieves the coordinates of the internal centers of the utility pole 100, stored in the memory section 36, to determine a function (three-dimensional function) of the curve connecting the internal centers.

At step S109, the calculation section 32 determines a function of the line connecting between the uppermost and the lowermost internal centers.

At step S110, the calculation section 32 determines an amount of deflection from the functions of the curve and the line obtained at steps 108 and 109, respectively.

At step S111, the assessment section 34 compares between an amount of allowable deflection of the utility pole stored in the memory section 36 and the amount of deflection obtained at step S110 and determines whether the obtained deflection is greater than the allowable deflection. If the obtained deflection is greater than the allowable deflection of the utility pole 100, a suitable warning is stored as a specific data of the utility pole 100.

According to the invention, the curve connecting respective internal centers at different levels and the deflection of the utility pole are readily obtained. Even for the slanted utility pole, the centers thereof can readily be collimated by the use of the reference scale formed on the focusing plate. This allows the deflections of the utility poles and their durations to be determined in a precise manner.

Although the y-coordinate is neglected for clarity in the above discussions, the deflections in any azimuth orientations can be determined by the use of another arithmetic scheme in which the above equations are modified by taking another element such as azimuth orientation β into consideration.

Also, the measurement means is not limited to use the laser, it may be another measurement section using ultrasonic wave.

Further, although the reference scale is provided on the focusing plate, it may be drawn on, for example, a transparent plate or projection plate made of glass plate provided within a focus depth in front of or behind the focusing plate, provided that the operator can see the object and the reference scale clearly through the eyepiece lens.

Figure 13:
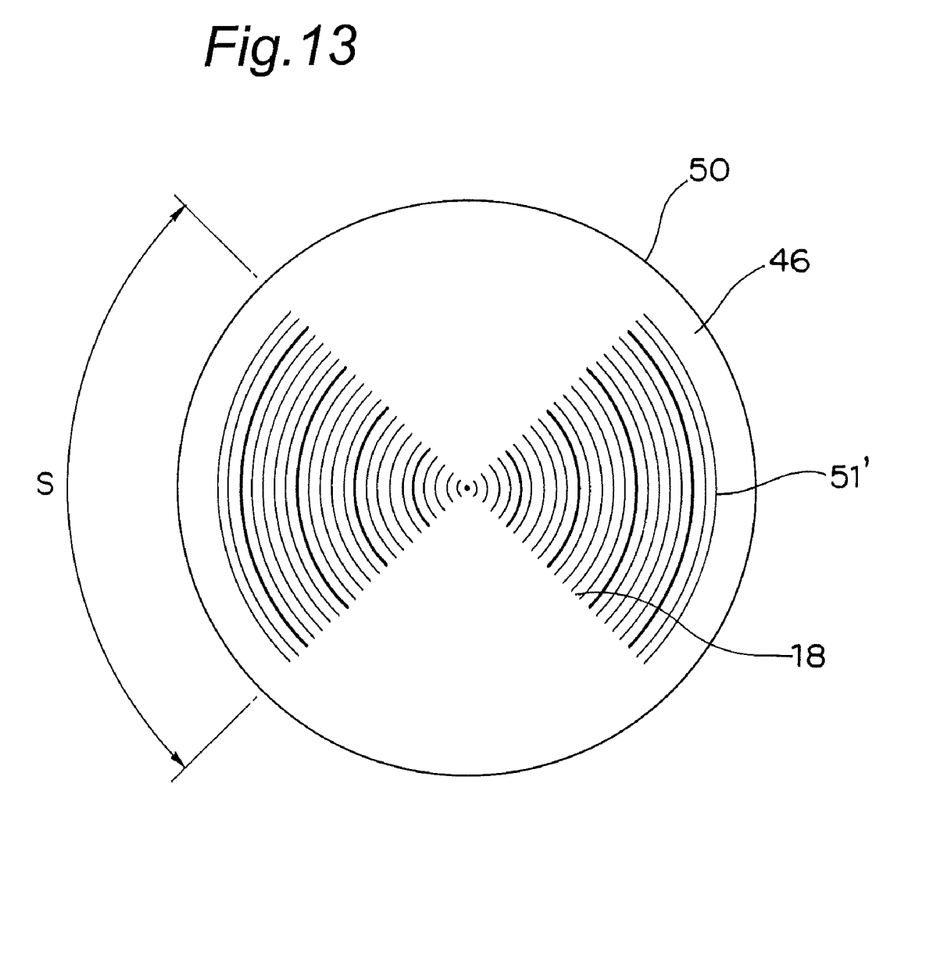
FIG. 13 is a diagram showing another embodiment of the reference scale.

Furthermore, the reference scale needs not be made of a plurality of concentric circles about the optical axis and, as shown in FIG. 13, it may be made by arranging a number of circular arcs 51' concentrically and symmetrically about the optical axis 18. In this embodiment, an angle or peripheral range S in which the arcs 51' extend is 30 to 90 degrees, preferably 45 to 60 degrees.

The invention claimed is:

1. An optical device, comprising:
   a body;
   a telescope having an object lens, a transparent plate, and an eyepiece lens arranged in this order along an optical axis, the telescope being supported by the body for rotation about a horizontal axis (X-axis) orthogonal to the optical axis, the transparent plate supporting a reference scale drawn thereon, the reference scale being made of full or substantially full circles or circular arcs arranged concentrically and symmetrically about the optical axis, whereby in use the optical axis is collimated at a surface center (Ps) of a cylindrical body so that left and right edges of the cylindrical body appear on the transparent plate at an equal first distance from the optical axis to allow an operator to read a scale number $n_\alpha$ associated with the first distance using the reference scale;
   a measurement section for measuring a second distance (L) from a reference point ($P_0$) where the optical axis crosses the horizontal axis (x-axis) to the surface center (Ps) and an elevation angle ($\theta$) between a horizontal plane and the optical axis when the optical axis is collimated at the surface center (Ps);
   a memory section for memorizing a relationship between the scale numbers $n_\alpha$ and a view angle ($\alpha$);
   an input section for allowing the operator to input the scale number ($n_\alpha$); and
   a calculation section for calculating the view angle ($\alpha$) from the scale number ($n_\alpha$) input from the input section and for calculating coordinates of an internal center (Pc) of the cylindrical body located on the optical axis collimated at the surface center (Ps), from the second distance (L), the view angle ($\alpha$), and the elevation angle ($\theta$).

2. The optical device of claim 1, wherein
the memory section memorizes the coordinates of the internal centers (Pc) of the cylindrical body, and
the calculation section defines a curve connecting the internal centers (Pc) of the cylindrical body.

3. The optical device of claim 2, wherein
the calculation section further defines a line connecting an uppermost internal center and a lowermost internal center of the cylindrical body, and determines an amount of deflection of the cylindrical body from the curve and the line defined by the calculation section.

4. The optical device of claim 3, wherein
the calculation section compares the amount of deflection of the cylindrical body to an allowable amount of deflection of the cylindrical body.

* * * * *